United States Patent [19]
Kashihara

[11] Patent Number: 5,146,202
[45] Date of Patent: Sep. 8, 1992

[54] VEHICULAR STEERING CONDITION DETECTING APPARATUS

[75] Inventor: Masanobu Kashihara, Himeji, Japan

[73] Assignee: Mitsubishi Denki Kabushiki Kaisha, Tokyo, Japan

[21] Appl. No.: 655,416

[22] PCT Filed: Jun. 5, 1990

[86] PCT No.: PCT/JP90/00732

§ 371 Date: Jan. 14, 1991

§ 102(e) Date: Jan. 14, 1991

[87] PCT Pub. No.: WO90/15304

PCT Pub. Date: Dec. 13, 1990

[30] Foreign Application Priority Data

Jun. 6, 1989 [JP] Japan .................. 1-144786

[51] Int. Cl.$^5$ ............................................. C08B 21/00
[52] U.S. Cl. .................................... 340/438; 180/79.1
[58] Field of Search ............... 340/438, 672, 425.5, 340/465, 575; 307/10.1; 364/424.05; 73/118.1; 180/143, 79.1

[56] References Cited

U.S. PATENT DOCUMENTS

| | | | |
|---|---|---|---|
| 4,007,357 | 2/1977 | Yanagishima | 340/672 X |
| 4,564,833 | 1/1986 | Seko et al. | 340/575 X |
| 4,586,032 | 4/1986 | Seko et al. | 340/575 X |
| 4,728,923 | 3/1988 | Finger | 340/438 |
| 4,848,499 | 7/1989 | Martinet et al. | 340/438 X |
| 4,893,688 | 1/1990 | Morishita | 180/79.1 |
| 4,996,657 | 2/1991 | Shiraishi et al. | 340/465 X |
| 5,029,466 | 7/1991 | Nishihara et al. | 73/118.1 |

FOREIGN PATENT DOCUMENTS

102103 4/1984 Japan .

*Primary Examiner*—Jin F. Ng
*Assistant Examiner*—Brian R. Tumm
*Attorney, Agent, or Firm*—Sughrue, Mion, Zinn, Macpeak and Seas

[57] ABSTRACT

A vehicular steering condition detecting apparatus a position sensor and a pulse generator each of which operate to generate an output in conjunction with the operating condition of a steering wheel, and a microcomputer which makes a comparison between a change in the output of the position sensor due to the operation of the steering wheel by the driver and the number of pulses generated by the pulse generator for every sampling period of a predetermined length, and determines that a failure occurred in the position sensor or the pulse generator if there exists no proportional relationship therebetween. The microcomputer compares between a change in the output of the position sensor due to the operation of the steering wheel by the driver and the number of pulses generated by the pulse generator for every sampling period of a predetermined length, and determines, by utilizing the fact that there is a proportional relation between the change in the position sensor output and the nuber of output pulses of the pulse generator when the position sensor and the pulse generator are normal, that a failure in the position sensor or the pulse generator occurred if there no longer exists a proportional relation therebetween.

1 Claim, 3 Drawing Sheets (A) PHASE A SIGNAL (B) PHASE B SIGNAL

VEHICULAR STEERING CONDITION DETECTING APPARATUS

TECHNICAL FIELD

This invention relates to a vehicular steering condition detecting apparatus which can detect a failure of a pulse generator, which senses the angular velocity of a steering wheel, by mutually checking the output signal of the pulse generator and the output signal of a position sensor, which senses the absolute value of the steering angle of the steering wheel.

BACKGROUND ART

FIG. 4 is a block diagram showing the construction of a known vehicular steering condition detecting apparatus. In FIG. 4, reference numeral 1 designates a steering wheel connected to a steering shaft 2 which is mounted on a front wheel steering mechanism 3.

The front wheel steering mechanism 3 is connected with a tie rod 4 to which a front wheel 5 is mounted.

A variable resistor 6 constituting a position sensor is connected to the steering shaft 2 so that the resistance thereof varies in accordance with the rotation of the steering shaft 2.

The variable resistor 6 is connected to an unillustrated power source so as to generate an output voltage which is proportional to the resistance thereof which varies with the rotation of the steering shaft 2. The output voltage of the variable resistor 6 is input to an analog/digital converter 7 (which is hereinafter referred to as an A/D converter).

The A/D converter 7 converts the output voltage of the variable resistor 6 into a digital value which is then output to a microcomputer 8.

The operation of the above apparatus will now be described. In accordance with the rotation of the steering wheel 1, the steering shaft 2 is thereby caused to rotate so that the resistance of the variable resistor 6 is accordingly varied. The variable resistor 6 generates an output voltage proportional to the varied resistance thereof to the A/D converter 7 where it is converted into a digital value.

The output of the A/D converter 7 is fed to the microcomputer 8 which calculates, based thereon, the absolute value of the steering angle and the angular velocity of the steering wheel 1, which are utilized as steering condition data for controlling various aspects of the operation of the vehicle.

With the known vehicular steering condition detecting apparatus as constructed above, a failure in the variable resistor 6 or a failure in the A/D converter 7 directly results in the destruction of the steering condition data prepared by the microcomputer 8. In addition, it is sometimes impossible to detect such a failure, thus providing the drawback that the control of the vehicle is seriously affected.

The present invention is intended to obviate the above-described drawback of the known vehicular steering condition detecting apparatus, and has for its object the provision of a vehicular steering condition detecting apparatus which is able to detect both a failure in the variable resistor for sensing the steering angle and a failure in the pulse generator for sensing the angular velocity of a steering wheel.

DISCLOSURE OF THE INVENTION

A vehicular steering condition detecting apparatus according to the present invention includes a position sensor and a pulse generator each of which operate to generate an output in conjunction with the operating condition of a steering wheel, and it further includes a microcomputer which makes a comparison between a change in the output of the position sensor due to the operation of the steering wheel by the driver and the number of pulses generated by the pulse generator for every sampling period of a predetermined length, and determines that a failure in the position sensor or the pulse generator occurred if there exists no proportional relationship therebetween.

The microcomputer of the present invention operates to make a comparison between a change in the output of the position sensor due to the operation of the steering wheel by the driver and the number of pulses generated by the pulse generator for every sampling period of a predetermined length, and determines, by utilizing the fact that there is a proportional relationship between the change in the position sensor output and the number of output pulses of the pulse generator when the position sensor and the pulse generator are normal, that a failure in the position sensor or the pulse generator occurred if there no longer exists a proportional relationship therebetween.

THE BEST MODE FOR EMBODYING THE INVENTION

Figure 1:
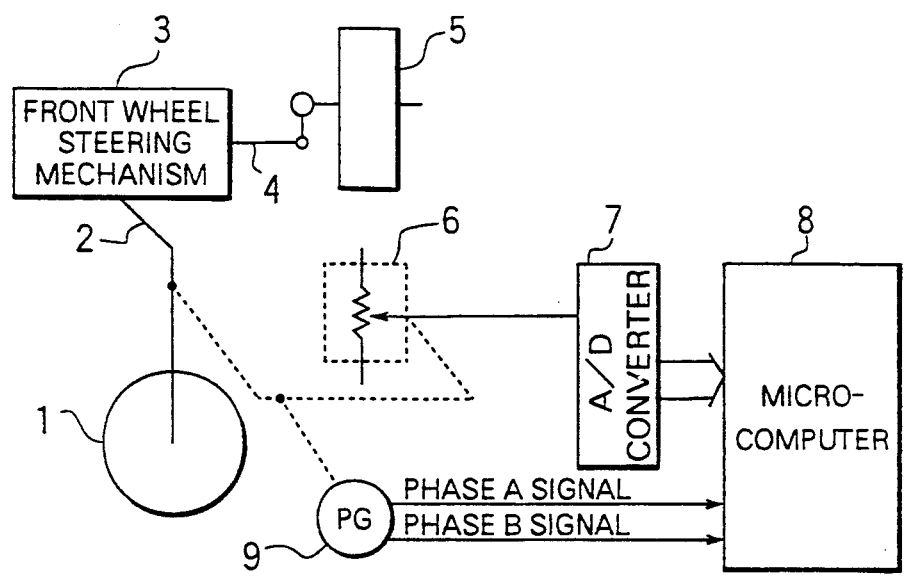
FIG. 1 is a block diagram showing the construction of a vehicular steering condition detecting apparatus in accordance with one embodiment of the present invention.

In the following, an embodiment of a vehicular steering condition detecting apparatus according to the present invention will now be described with reference to the accompanying drawings. FIG. 1 is a block diagram showing the construction of this embodiment.

Figure 4:
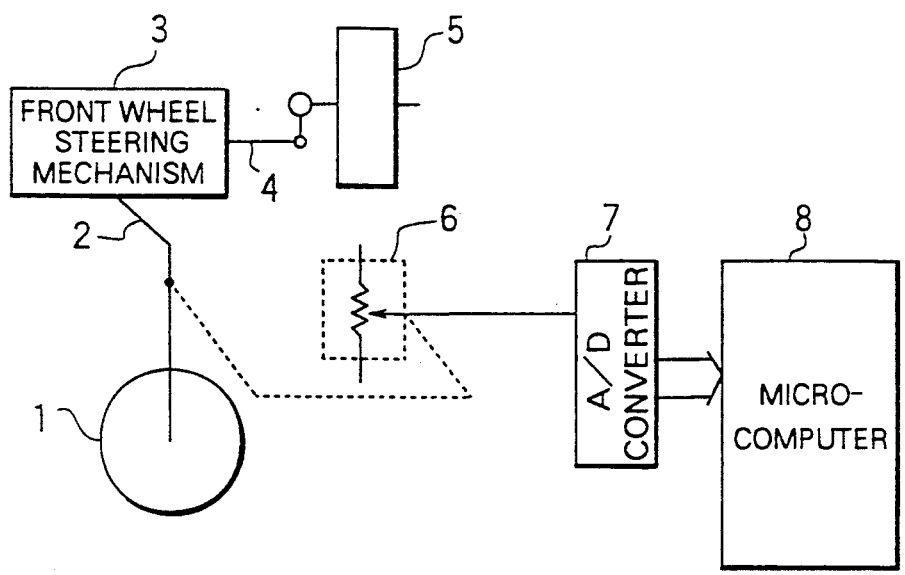
FIG. 4 is a block diagram of the construction of a conventional vehicular steering condition detecting apparatus.

In FIG. 1, for the purpose of explaining the construction of the embodiment, the same components as those of FIG. 4 are identified by the same symbols so as to avoid an unnecessary duplicate explanation thereof.

As clearly seen from a comparison between FIGS. 1 and 4, those portions which are identified by reference numerals 1 through 8 in FIG. 1 are the same as those in FIG. 4, excepting that a pulse generator, which is designated by reference numeral 9, is added to the construction of FIG. 4.

Figure 2:
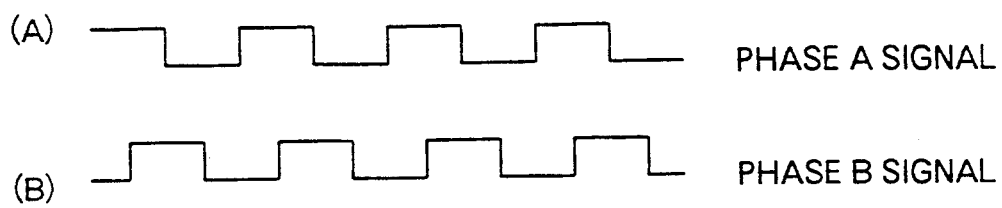
FIG. 2 is a wave form diagram showing the output signal of a pulse generator of the embodiment of FIG. 1.

Similar to the variable resistor 6 constituting a position sensor, the pulse generator 9 is connected to the steering shaft 2 so that it generates output pulses in conjunction with the operation of the steering wheel 1. The pulse generator 9 sends to the microcomputer 8 an output signal which contains two kinds of pulses comprising a series of pulses of phase A and a series of pulses of phase B, which are 90 degrees out of phase with respect to each other, as shown in FIGS. 2(A) and 2(B).

The microcomputer 8 receives the output signal of the A/D converter 7 and the phase A pulses and the phase B pulses of the pulse generator 9, and makes, based thereon, a comparison between a change in the output of the variable resistor 6 due to the driver's steering operation and the number of pulses generated by the pulse generator 9 for every sampling period of a predetermined length, so that it can detect a failure in the A/D converter 7 or a failure in the variable resistor 6 or a failure in the pulse generator 9 by checking, on the basis of the fact that there is a proportional relation between the change in the variable resistor output and the number of the generated pulses when the A/D converter 7 and the pulse generator 9 are normal, whether there is a proportional relation therebetween. The construction of this embodiment other than the above is the same as that of FIG. 4.

The operation of this embodiment will now be described in detail. When the driver turns the steering wheel 1, the variable resistor 6, forming a position sensor, and the pulse generator 9, which are connected to the steering shaft 2, are caused to rotate in accordance with the turning of the steering wheel 1, so that the variable resistor 6 generates an output signal which is input to the A/D converter 7 where it is converted into a digital value which is in turn output to the microcomputer 8 so as to be utilized therein for detecting the absolute position of the steering wheel 1.

Also, the pulse generator 9 generates an output signal which is directly input to the microcomputer 8 which can identify, based thereon, the steering direction of the steering wheel 1 and detect the absolute position thereof by counting the number of pulses contained therein.

Further, the microcomputer 8 can calculate the angular velocity of the steering wheel 1 by differentiating the number of pulses thus counted with respect to time.

Figure 3:
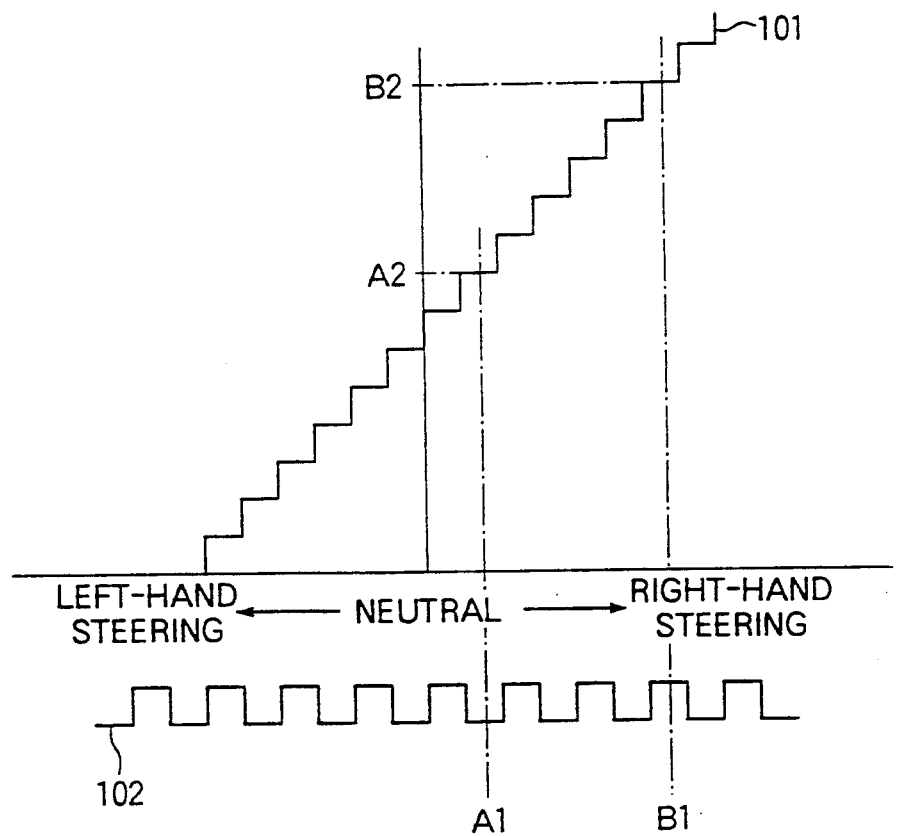
FIG. 3 is an explanatory view showing the relationship between the steering condition of a steering wheel and a microcomputer for an explanation of the operation of the above embodiment.

According to the present invention, these signals are utilized for readily detecting a failure in the variable resistor 6 and a failure in the pulse generator 9. FIG. 3 is a view for explaining this situation, in which the abscissa represents the steering condition of the steering wheel 1 and the ordinate represents data in the microcomputer 8.

In FIG. 3, reference numeral 101 designates the absolute value of the steering angle representative of the position of the steering wheel 1 which is the output signal of the variable resistor 6 converted into a digital value by the A/D converter 7 and transmitted therefrom to the microcomputer 8.

Reference numeral 102 designates the output signal of the pulse generator 9 representative of the relative position of the steering wheel 1.

The microcomputer 8 is programmed in advance in such a manner that it can detect the absolute value 101 of the steering wheel position and the relative position 102 of the steering wheel 1 for every sampling period of a predetermined length.

Here, let us assume that the time at which an arbitrary first sampling is performed is point A1 and the absolute value of the position of the steering wheel 1 at that time is point A2.

Further, assuming that the subsequent sampling time after the steering wheel 1 has once been turned is point B1, and that the absolute value of the position of the steering wheel 1 is point B2, a change in the absolute value of the position of the steering wheel 1 during the time from the first sampling point A1 to the second sampling point B1 is the distance between B2 and A2.

Similarly, the change in the relative position of the steering angle of the steering wheel 1 can be determined by the number of pulses generated by the pulse generator 9 during the time from point A1 to point B1.

There exists a proportional relationship between the change (B2-A2) in the absolute value of the steering wheel position and the number of output pulses of the pulse generator 9 which corresponds to the change in the relative position of the steering wheel 1. Therefore, by detecting, upon every arbitrary sampling, whether there exists a proportional relationship therebetween, it is possible to confirm whether the output signals of the position sensor and the pulse generator 9 are normal.

As described in the foregoing, according to the present invention, the fact that there exists a proportional relation between a change in the output signal of the steering-angle sensing position sensor which is digitized by the A/D converter and a change in the number of pulses generated by the pulse generator is utilized for detecting a failure in the output signals of the position sensor and the pulse generator by checking the changes in these signals for every sampling period. Thus, by detecting a discrepancy in these signals, it is possible to detect a failure in the position sensor and the pulse generator in a simple manner, thus preventing in advance the control of the vehicle from being seriously endangered.

I claim:

1. A vehicular steering condition detecting apparatus comprising a position sensor for generating, in conjunction with an operation of a steering wheel of a vehicle, an output signal which is proportional to the steering angle of the steering wheel, a pulse generator for generating pulses in conjunction with an operation of the steering wheel for sensing the angular velocity of the steering wheel, an analog/digital converter for converting the output signal of the position sensor into a digital value, and a microcomputer for comparing between a change in the output of the position sensor due to the operation of the steering wheel by the driver and the number of pulses generated by the pulse generator for every sampling period of a predetermined length, the microcomputer being operable to determine that a failure in the position sensor or the pulse generator occurred if there exists no proportional relationship therebetween.

* * * * *